July 5, 1966 H. PONIKTERA 3,259,731
METHOD AND MACHINE FOR MAKING HONEYCOMB CORE
Filed Jan. 22, 1957 7 Sheets-Sheet 2

INVENTOR.
H. PONIKTERA
BY George Stell
AGENT

July 5, 1966  H. PONIKTERA  3,259,731
METHOD AND MACHINE FOR MAKING HONEYCOMB CORE
Filed Jan. 22, 1957  7 Sheets-Sheet 3

INVENTOR.
H. PONIKTERA
BY George Stell
AGENT

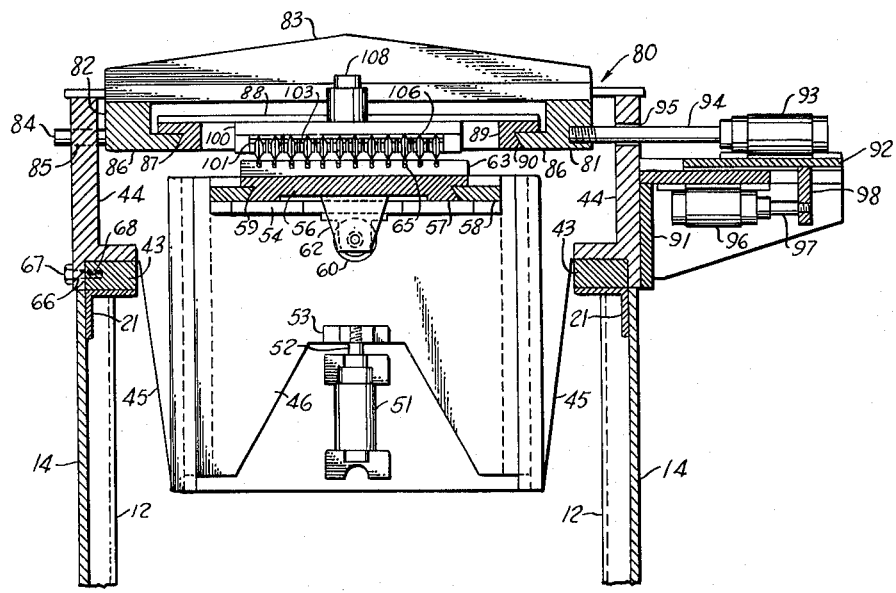

July 5, 1966  H. PONIKTERA  3,259,731
METHOD AND MACHINE FOR MAKING HONEYCOMB CORE
Filed Jan. 22, 1957  7 Sheets-Sheet 5

INVENTOR.
H. PONIKTERA
BY George Stell
AGENT

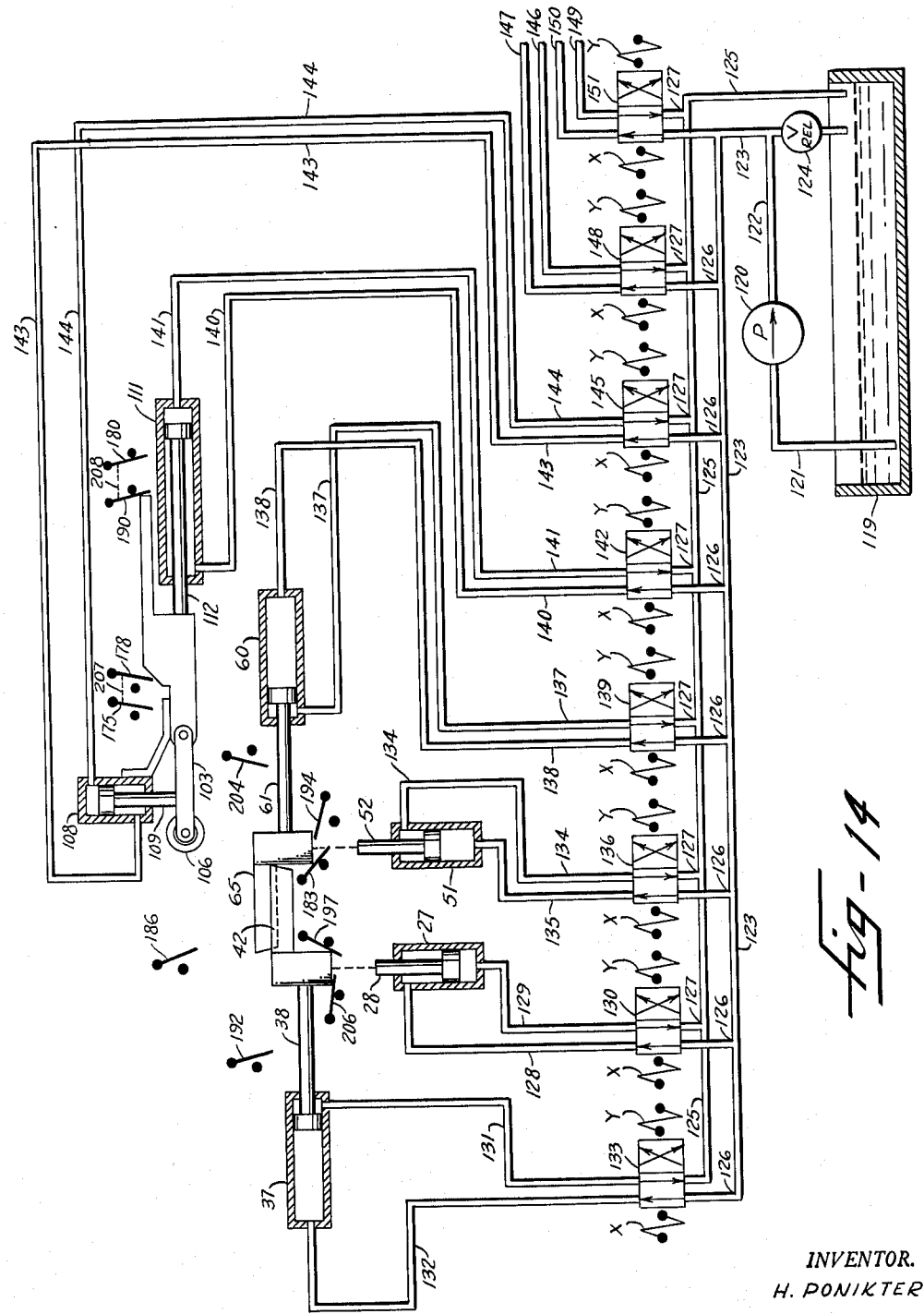

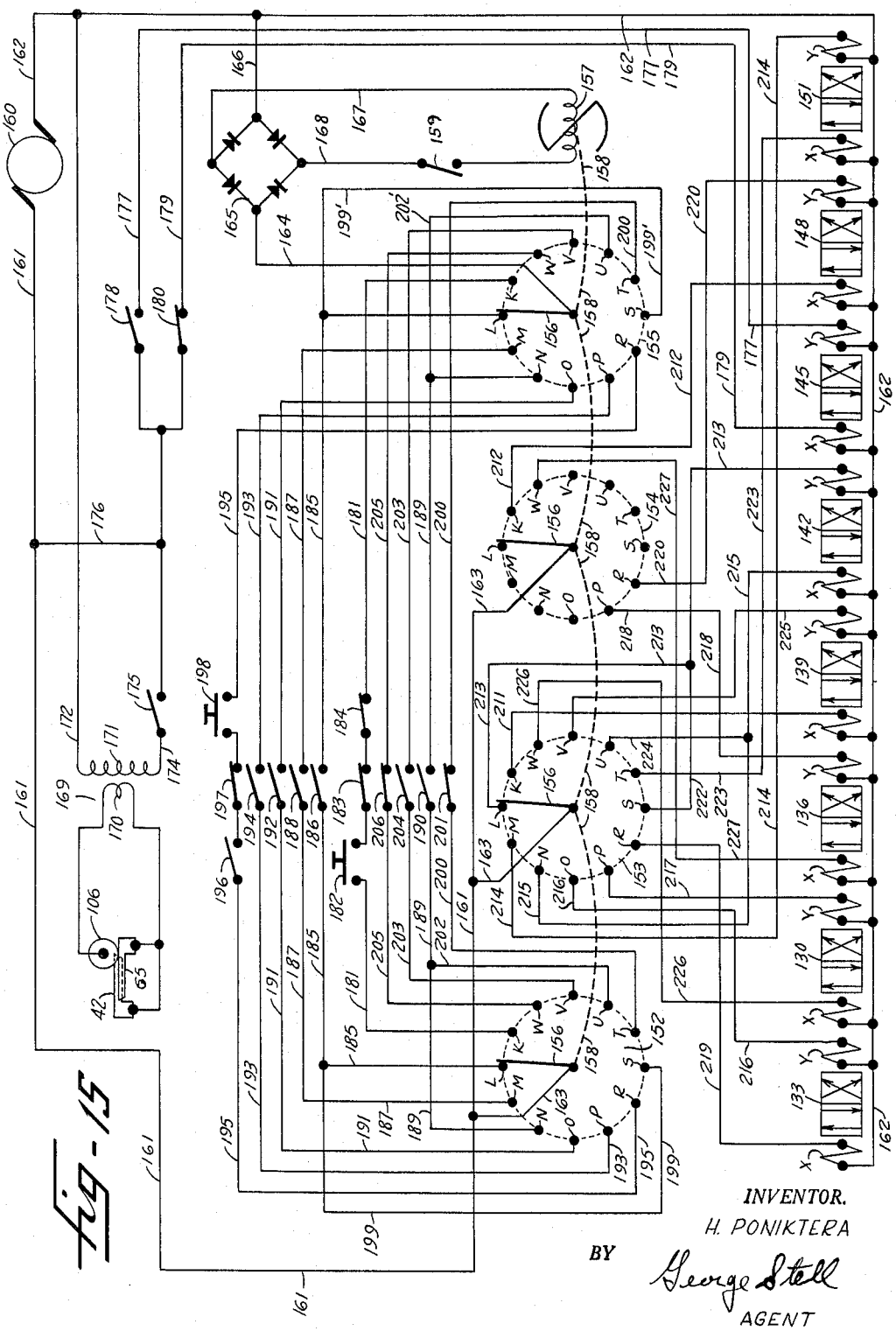

United States Patent Office 3,259,731
Patented July 5, 1966

3,259,731
METHOD AND MACHINE FOR MAKING HONEYCOMB CORE
Henry Poniktera, El Cajon, Calif., assignor to Rohr Corporation, a corporation of California
Filed Jan. 22, 1957, Ser. No. 635,357
22 Claims. (Cl. 219—82)

This invention relates to a method and apparatus for resistance welding strips of thin corrugated metal together at evenly spaced points along their entire length in a manner to form a metallic honeycomb structure.

Metal panels comprising a metallic honeycomb core having its ends secured to the opposing faces of a pair of sheet metal skins are now being extensively used in the fabrication of aircraft and other structures requiring a strong and lightweight metal covering. The metallic honeycomb used in the construction of such panels usually consists of a series of thin corrugated metal strips having a thickness of from .002 to .003 inch, which are secured together at evenly spaced points along their entire length in a manner to form a honeycomb structure. In order to produce a metallic honeycomb core of this kind having maximum strength with regard to the type of metal used in its construction, it is necessary that the corrugated strips be firmly secured together across their entire width without damaging or distorting the metal and that the cells of the core formed by the corrugations are of uniform shape and size. It is also desirable, particularly in honeycomb core used for aircraft construction, that the manner in which the corrugated strips are secured together is not affected by extreme temperature variations and does not result in a substantial increase in the weight of the finished honeycomb core.

It is an object of this invention to provide a method and apparatus for resistance welding successive strips of thin corrugated metal together across their entire width and at spaced apart points to form a metallic honeycomb core.

A further object is to provide a machine in which the strips of corrugated metal are held and supported while being resistance welded together in a manner to prevent distortion and deformation thereof.

Another object is to provide a method and apparatus for making metallic honeycomb core in which strips of thin corrugated metal are resistance welded together at a plurality of evenly spaced apart points simultaneously.

A further object is to provide a machine in which the resistance welding electrodes are automatically positioned and actuated to perform the welding operations.

Another object is to provide a method and apparatus for making metallic honeycomb core in which the strips of corrugated metal are positioned relative to each other and held in these positions during the welding operation to produce a honeycomb structure having cells of uniform shape and size.

These and other objects and advantages of the invention will become apparent as the description thereof proceeds.

For a better understanding of the invention reference is made to the accompanying drawing illustrating a preferred embodiment thereof and in which:

FIG. 4 is a cross sectional view of the machine taken on line 4—4 of FIG. 3.

FIG. 5 is a cross sectional view of the machine taken on line 5—5 of FIG. 3.

FIG. 6 is a cross sectional view of the machine taken on line 6—6 of FIG. 3.

FIG. 7 is a cross sectional view of the machine taken on line 7—7 of FIG. 3.

FIG. 14 is an additional schematic view of the hydraulic system of the machine and the manner in which certain parts moved thereby operate certain electrical switches; and FIG. 15 is a diagrammatic view of the electrical system in the machine.

Figure 1:
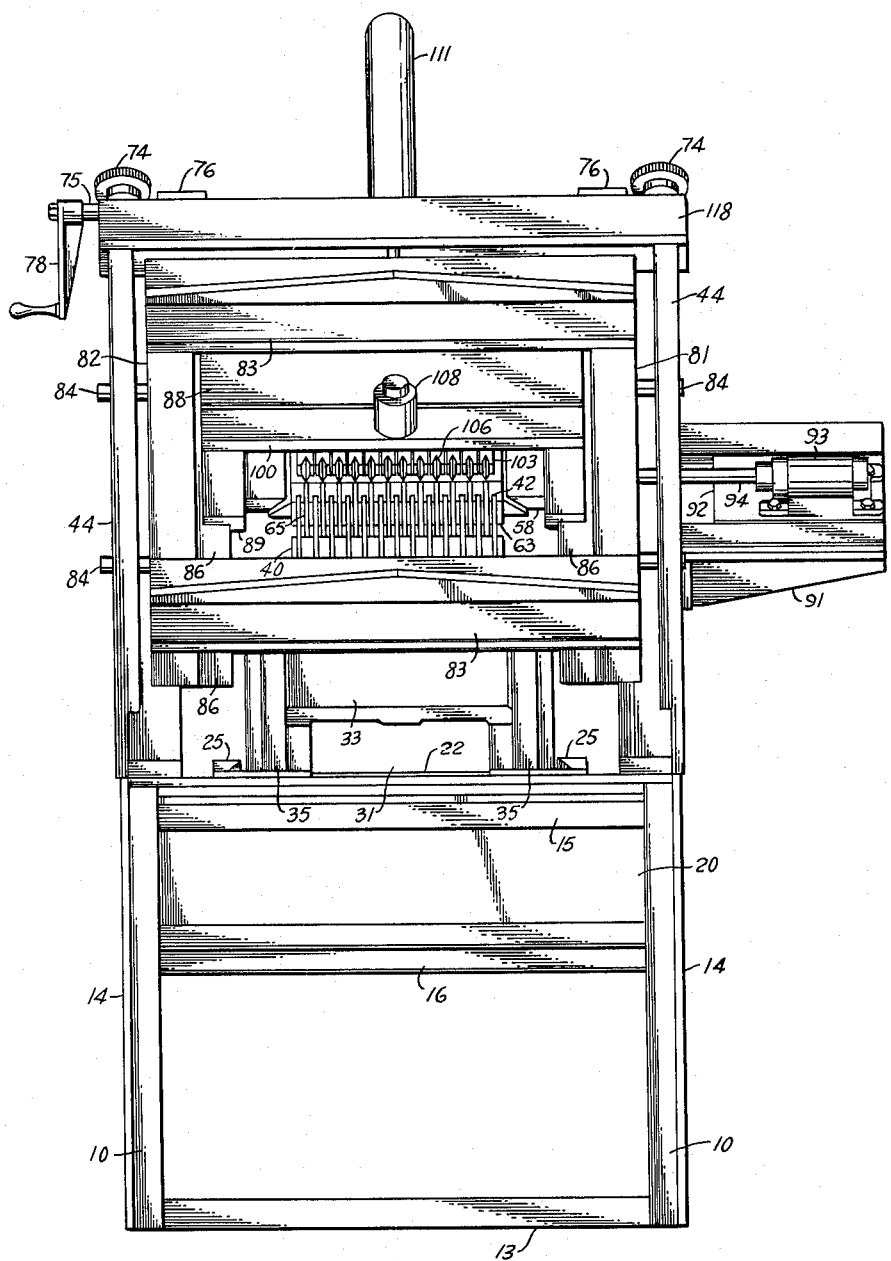
FIG. 1 is a front elevation of the machine.
Figure 2:
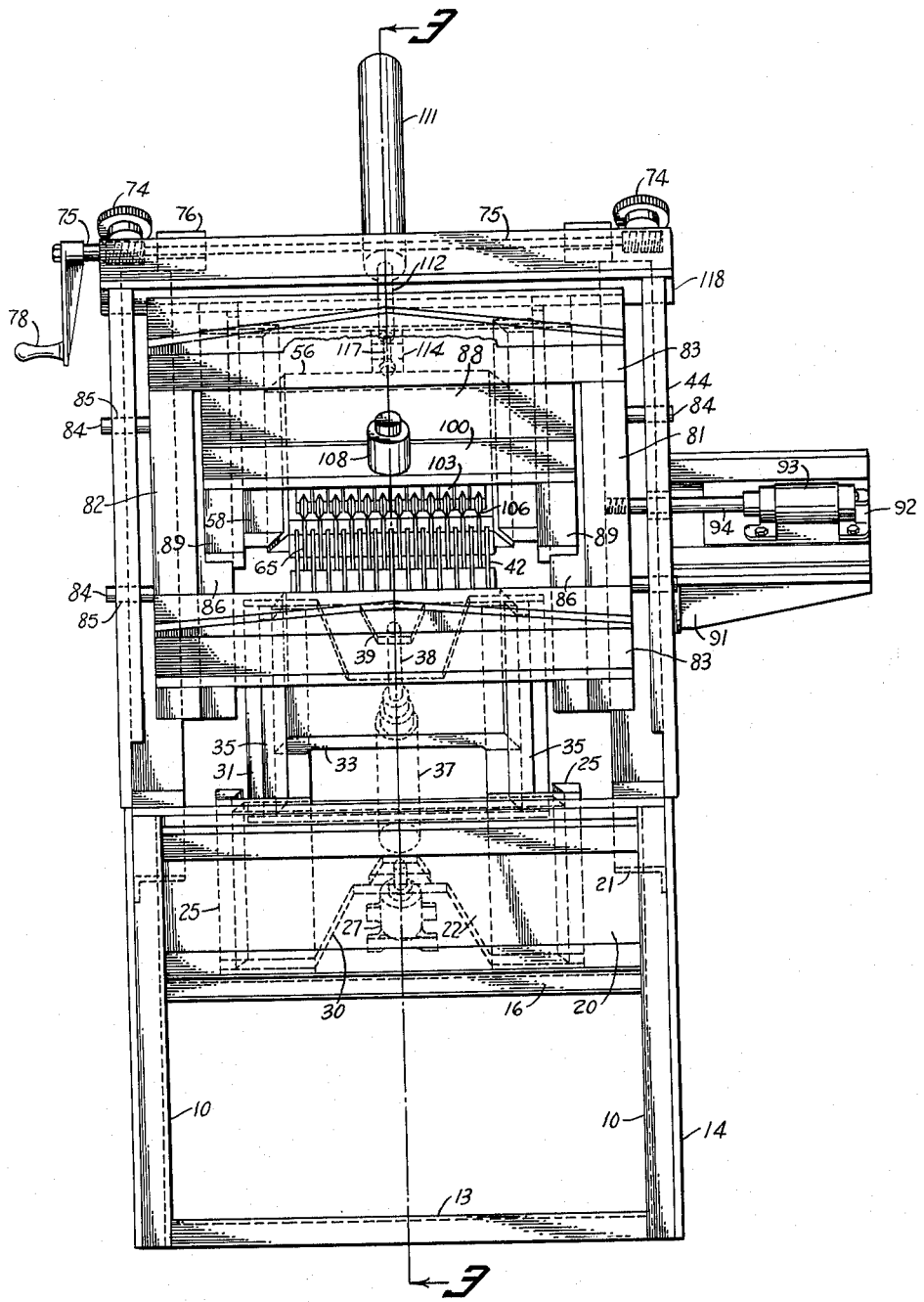
FIG. 2 is a front elevation of the machine with various parts thereof outlined in phantom lines to show their relative positions.
Figure 3:
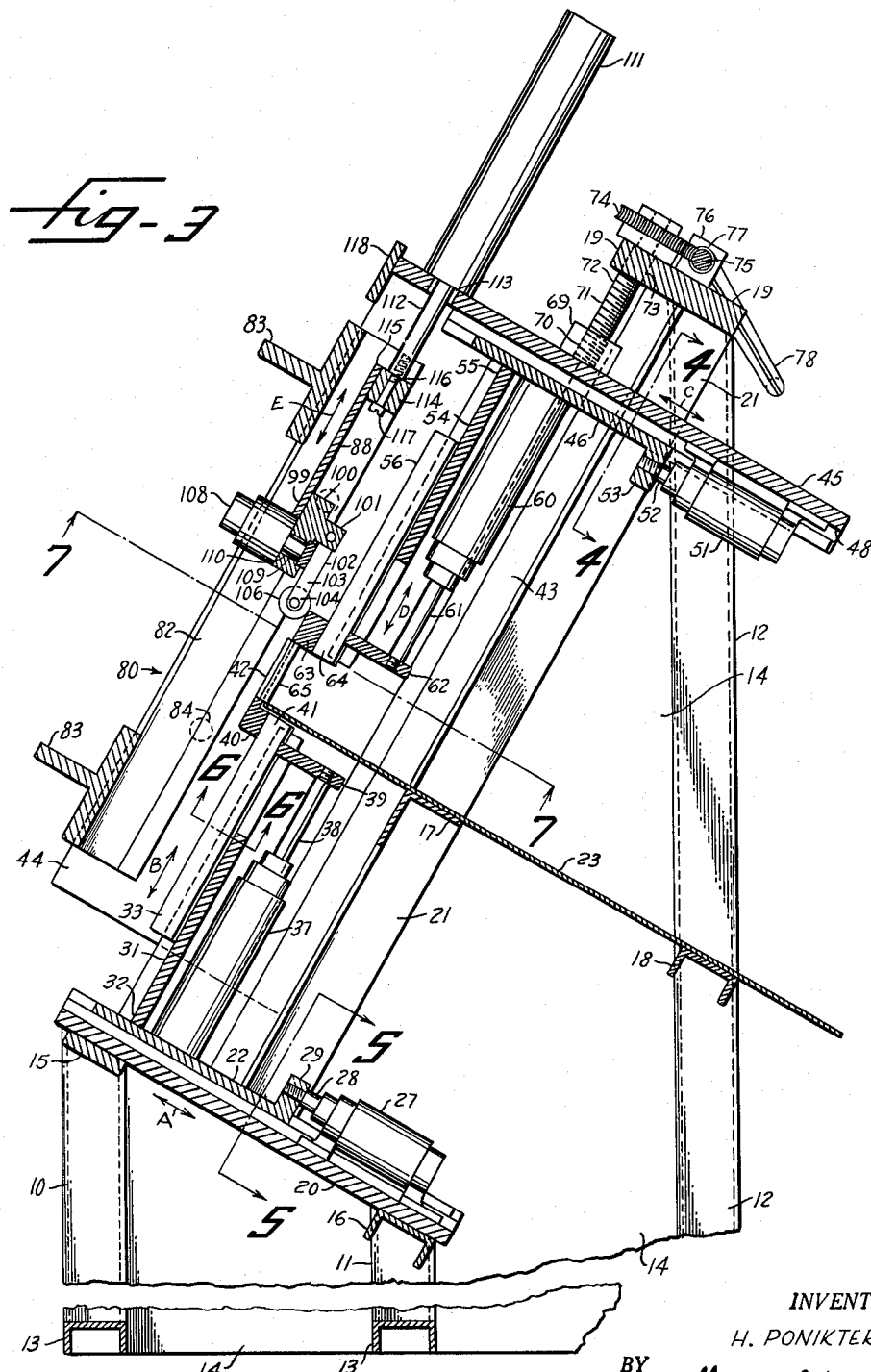
FIG. 3 is an enlarged cross sectional view of the machine taken on line 3—3 of FIG. 2.

With reference to FIGS. 1 to 7 of the drawing the machine comprises a rigid frame having vertical side members 10, 11 and 12 connected together by horizontal base members 13 and horizontal supporting members 15, 16, 17, 18 and 19. A plate 20 is secured to members 15 and 16 between members 10 and 11 which is inclined at an acute angle as shown in FIG. 3 of the drawing. A rigid member 21 is secured to each end of plate 20 which extends upwardly at right angles to plate 20 and has its upper end connected to the upper end of vertical member 12 and the end of horizontal member 19. A plate 22, having edges 24 (see FIG. 5) inclined at an acute angle, is slidably positioned on plate 20 and held in position thereon by a pair of gibs 25 secured to plate 20 and having faces 26 arranged to slidably engage edges 24. A hydraulic cylinder and piston assembly 27 is secured to plate 20 with the piston rod 28 thereof connected to a projecting portion 29 of plate 22 to move plate 22 along plate 20 in the directions indicated by double arrow A. Plate 22 is shaped as shown in FIG. 2 with a portion cut away as indicated at 30 to permit the plate to extend rearwardly along each side of cylinder 27. A plate 31 having its lower end 32 rigidly secured to plate 22 extends upwardly from plate 22 at right angles thereto. A plate 33 having edges 34 (see FIG. 6) inclined at an acute angle is slidably positioned on plate 31 and is held in position by a pair of gibs 35 secured to plate 31 and having faces 36 arranged to slidably engage edges 34. A hydraulic cylinder and piston assembly 37 is secured to plate 22 with its piston rod 38 connected to a projecting portion 39 of plate 33 to move plate 33 along plate 31 in the directions indicated by double arrow B. A bar 40 composed of metal having high electrical conductivity is secured to the upper end 41 of plate 33 and extends along the entire width thereof and a row of electrode pins 42, also composed of metal having high electrical conductivity, are secured to bar 40 and extend upwardly therefrom in evenly spaced apart parallel positions. A rigid bar-like member 43 (see FIG. 7) is secured to each of members 21 and extends the full length thereof and attached to each of members 43 is a side plate 44 shaped as shown in FIG. 7 which extends outwardly therefrom. A plate 45 is secured to and extends between the upper ends of plates 44 and is parallel to plate 20. A plate 46 having edges 47 inclined at an acute angle (see FIG. 4) is slidably positioned on the lower surface 48 of plate 45 and held in position thereon by a pair of gibs 49 having faces 50 arranged to slidably engage edges 47. A hydraulic cylinder and piston assembly 51 secured to lower surface 48 of plate 45 has its piston rod 52 connected to a projecting portion 53 of plate 46 to move plate 46 along plate 45 in the directions indicated by double arrow C. Plate 46 is shaped similar to plate 22 so that a portion thereof extends rearwardly along each side of cylinder 51. A plate 54 having its upper end 55 rigidly connected to plate 46 extends downwardly from plate 46 at right angles thereto. A plate 56 having edges 57 inclined at an acute angle (see FIG. 7) is slidably positioned on plate 54 and is held in position thereon by a pair of gibs 58 secured to plate 54 and having faces 59 arranged to slidably engage edges 57. A hydraulic cylinder and piston assembly 60 is secured to plate 46 with its piston rod 61 connected to an inwardly extending portion 62 of plate 56 to move plate 56 along plate 54 in the directions indicated by double arrow D. A bar 63 of metal having high electrical conductivity is secured to the lower end 64 of plate 56 and extends along the entire width thereof and a row of electrode pins 65, similar in size and shape to pins 42 and also composed of metal having high electrical conductivity, are secured to bar 63 and extend downwardly therefrom in evenly spaced apart parallel positions and are arranged to extend between electrode pins 42. Pins 42 and 65 are spaced apart an equal distance and are substantially equal in length and project from bars 40 and 63 a sufficient distance to extend between upper end 41 of plate 33 and lower end 64 of plate 56 when plate 33 is raised to the limit of its upward movement on plate 31 and plate 56 is lowered to the limit of its downward movement on plate 54. To provide means for adjusting the distance between the ends of plates 33 and 56 when the plates are in this position, plates 44 are provided with openings 66 (see FIG. 7) which are vertically elongated and through which bolts 67 pass to engage suitably threaded openings 68 in bar 43. By loosening bolts 67 plates 44 may be moved upwardly or downwardly a distance equal to the length of the elongated openings and, since plate 45, to which plates 46, 54 and 56 are connected, is attached to plates 44, movement of plates 44 results in a corresponding movement of these plates. To move plates 44 and the above described assembly attached thereto to a desired position a block 69 is secured to the upper surface of plate 45 adjacent each end thereof each block being provided with a threaded opening 70 in which the threaded ends 71 of a pair of rods 72 are engaged. Rods 72 extend upwardly through openings 73 in member 19 and each rod has worm wheel 74 secured to the upper end thereof. A shaft 75 which extends along the length of member 19 and is rotatably secured thereto by brackets 76 has a pair of worm gears 77 secured thereto in engagement with worm wheels 74 and has a crank 78 secured to one end with which the shaft is rotated. Rotation of shaft 75 and worm gears 77 causes worm wheels 74 and rods 72 to be rotated so that ends 71 are advanced into or withdrawn from openings 70 as desired to raise or lower plate 45 and the entire assembly attached thereto to the desired position. Bolts 67 are then tightened to lock the entire assembly in adjusted position. This adjustment permits plates 33 and 56 to be spaced apart a distance equal to the width of the corrugated strips of metal used in making the honeycomb structure.

Positioned between plates 44 outwardly of plates 33 and 56 is a rigid frame 80 comprising side members 81 and 82 having rigid connecting members 83 secured thereto. Frame 80 is supported by rigid pins 84 which project from side members 81 and 82 and extend through openings 85 in plates 44. Side members 81 and 82 are spaced away from plates 44 as shown in FIG. 1 and pins 84 are slidable in openings 85 to permit frame 80 to move sidewise a small amount in a manner and for a purpose to be explained. Side members 81 and 82 are both provided with inwardly projecting portions 86 (see FIG. 7) having faces 87 inclined at an acute angle. A rigid plate 88 is positioned between members 81 and 82 which has parallel guide members 89 secured thereto adjacent its sides which are provided with faces 90 arranged to slidably engage faces 87 to thereby hold and guide plate 88 for vertical movement between side members 81 and 82. A rigid support 91 is secured to plate 44 as shown in FIG. 7 on which a plate 92 is slidably secured in a known manner. A hydraulic cylinder and piston assembly 93 is secured to plate 92 with its piston rod 94 extending through an opening 95 in plate 44 and connected to side member 81 for the purpose of moving frame 80 sidewise on pins 84 a predetermined distance. Attached to the opposite side of support 91 is a hydraulic cylinder and piston assembly 96 having its connecting rod 97 connected to a bar 98 which is secured to plate 92 to move plate 92, cylinder and piston assembly 93 and connecting rod 94 a predetermined distance and thereby cause frame 80 to be moved sidewise an equal distance. Cylinder and piston assemblies 93 and 96 are so arranged that the distance that frame 80 is moved by cylinder and piston 96 as above described is equal to one-half of the distance that the frame is moved by cylinder and piston 93 for a purpose to be explained as the operation of the machine is described. Attached to plate 88 between guides 89 and extending downwardly from its lower end 99 is a block 100 composed of metal having high electrical conductivity which is shaped as shown having a depending portion 101 provided with slots (not shown) in which the ends 102 of a row of downwardly extending arms 103 are pivotally secured. The extending end 104 of each of arms 103 is provided with a slot 105 arranged to receive an electrode wheel 106 which is rotatably secured therein by means of a pin 107 (see FIG. 8) extending transversely through arm 103 and the center of wheel 106. Arms 103 are evenly spaced apart so that the distance between the centers of wheels 106 is equal to twice the distance between the centers of electrode pins 42 or electrode pins 65. A hydraulic cylinder and piston assembly 108 is secured to the upper surface of block 100 with its piston rod 104 extending through an opening 110 in block 100 to engage arms 103 for a purpose to be explained. A hydraulic cylinder and piston assembly 111 is secured to the upper surface of plate 45 with its piston rod 112 extending downwardly through an opening 113 in the plate to a block 114 secured to the upper end 115 of plate 88 between guides 89. Block 114 is provided with an opening 116 through which a bolt 117 passes to engage and connect rod 112 to block 114 for movement of plate 88, guides 89, block 100, arms 103 and block 114 in the directions indicated by double arrow E to thus cause electrode wheels 106 to be moved along electrode pins 42 and 65 in a manner to be described. Opening 116 is elongated transversely in block 114 and bolt 117 is slidable sidewise therein so that block 114 is movable sidewise with frame 80 without restraint from piston rod 112. A rigid bar 118 is secured to plate 45 and connected to plates 44 to support plate 45 and prevent any distortion thereof by the force exerted by cylinder and piston assembly 111. The machine is also provided with suitable covering plates indicated at 14 which also increase the rigidity of the structure.

Figure 13:
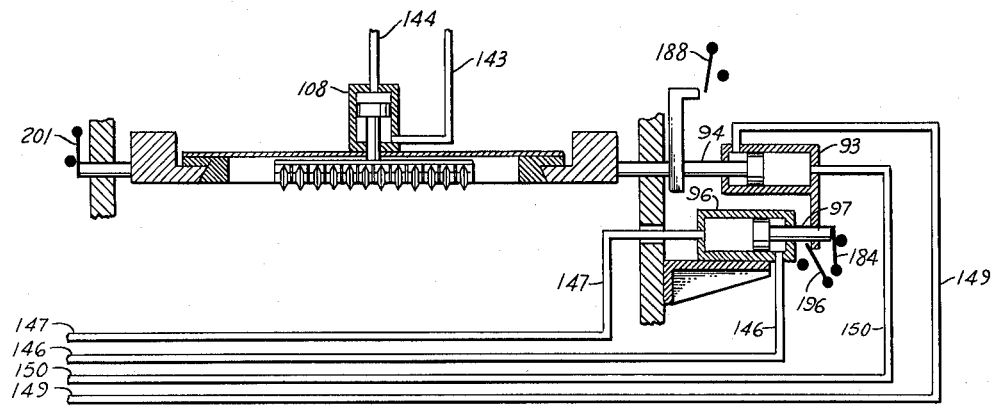
FIG. 13 is a partial schematic view of the machine's hydraulic system illustrating the manner in which one set of electrodes are moved to various positions and the manner in which certain electrical switches are operated by such movements.

The hydraulic system whereby the hydraulic cylinder and piston assemblies included in the foregoing description are supplied with pressurized fluid to perform the described movements, is schematically shown in FIGS. 13 and 14 of the drawing. The system comprises a fluid reservoir 119 and a pump 120 having an inlet pipe 121 connected to reservoir 119 and an outlet pipe 122 connected to a presurized fluid distribution line 123 which is provided with a pressure relief valve 124 discharging into reservoir 119. A fluid return line 125 is provided for the return of fluid exhausted by the cylinder and piston assemblies to reservoir 119. Line 123 is provided with outlets 126 through which pressurized fluid is discharged to each of the cylinder and piston assemblies and line 125 is provided with inlets 127 through which fluid exhausted by the cylinder and piston assemblies is admitted for return to reservoir 119. Cylinder and piston assembly 27 is provided with a pipe 128 extending from its rod end and a pipe 129 extending from its head end each of which may be connected to an inlet 127 to line 125 or to an outlet 126 from line 124 through a valve 130. Valve 130 is a known type of solenoid operated valve having electrical coils X and Y positioned at opposite ends thereof which control the position of the valve to direct the flow of fluid therethrough as desired. By directing electrical current to coil X valve 130 is positioned to connect pipe 128 to an outlet 126 in line 123 and to connect pipe 129 to an inlet 127 in line 125 and by directing current to coil Y the position of the valve is changed to connect pipe 128 to an inlet 127 and to connect pipe 129 to an outlet 126 so that pressurized fluid may be selectively directed to either end of the cylinder and the opposite end provided with an outlet for exhausting fluid therefrom. Cylinder and piston assembly 37 is provided with a pipe 131 extending from its rod end and a pipe 132 extending from its head end each of which may be connected to an inlet 127 to line 125 or to an outlet 126 from line 123 through a valve 133 similar in operation to valve 130 and having similar electrical coils X and Y positioned at opposite ends thereof to operate the valve. By directing electrical current to coil X of valve 133 the valve is moved to a position whereby pipe 132 is connected to an outlet 126 of line 123 and pipe 131 is connected to an inlet 127 of line 125 and by directing current to coil Y the valve is positioned to connect pipe 132 to an inlet 127 of line 125 and connect pipe 131 to an outlet 126 of line 123. Cylinder and piston assembly 51 is provided with a pipe 134 extending from its rod end and a pipe 135 extending from its head end each of which may be connected to an inlet 127 to line 125 or to an outlet 126 from line 123 through a valve 136 similar in operation to valve 130 and having similar electrical coils X and Y positioned at opposite ends thereof to operate the valve. By directing electrical current to coil X valve 136 is positioned to connect pipe 135 to an outlet 126 of line 123 and pipe 134 is connected to an inlet 127 to line 125 and current directed to coil Y positions valve 136 so that pipe 135 is connected to an inlet 127 to line 125 and pipe 134 is connected to an outlet 126 of line 123. Cylinder and piston assembly 60 is provided with a pipe 137 extending from its rod end and a pipe 138 extending from its head end each of which may be connected to an inlet 127 to line 125 or to an outlet 126 from line 123 through a valve 139 similar to valve 130. By directing electrical current to coil X valve 139 is positioned to connect pipe 137 to an inlet 127 to line 125 and pipe 138 is connected to an outlet 126 from line 123 and current directed to coil Y positions valve 139 so that pipe 137 is connected to an outlet 126 from line 123 and pipe 138 is connected to an inlet 127 to line 125. Cylinder and piston assembly 111 is provided with a pipe 140 extending from its rod end and a pipe 141 extending from its head end each of which may be connected to an inlet 127 to line 125 or to an outlet 126 from line 123 through a valve 142 which is similar to the previously described valves. By directing current to coil X of valve 142 the valve is positioned to connect pipe 140 to an outlet 126 from line 123 and pipe 141 is connected to an inlet 127 to line 125 and current directed to coil Y of valve 142 positions the valve to connect pipe 140 to an inlet 127 to line 125 and pipe 141 to an outlet 126 from line 123. Cylinder and piston assembly 108 is provided with a pipe 143 extending from its rod end and a pipe 144 extending from its head end each of which may be connected to an outlet 126 from line 123 or to an inlet 127 to line 125 through a valve 145 which is similar in operation and construction to the previously described valves. By directing electrical current to coil Y of valve 145 the valve is positioned to connect pipe 144 to an outlet 126 from line 123 and pipe 143 is connected to an inlet 127 to line 125 and by directing current to coil X the valve is positioned to connect pipe 144 to an inlet 127 to line 125 and pipe 143 is connected to an outlet 126 from line 123. Cylinder and piston assembly 96 has a pipe 146 extending from its rod end and a pipe 147 extending from its head end each of which may be connected to an inlet 127 to line 125 or to an outlet 126 from line 123 through a valve 148 which is similar to the valves previously described. By directing electrical current to coil X of valve 148 the valve is positioned to connect pipe 147 to an outlet 126 from line 123 and pipe 146 is connected to an inlet 127 to line 125 and by directing current to coil Y the valve is positioned to connect pipe 147 to an inlet 127 to line 125 and pipe 146 is connected to an outlet 126 from line 123. Cylinder and piston assembly 93 is provided with a pipe 149 extending from its rod end and a pipe 150 extending from its head end each of which may be connected to an inlet 127 to line 125 or to an outlet 126 from line 123 through a valve 151 which is similar in construction to the previously described valves. By directing electrical current to coil X of valve 151 the valve is positioned to connect pipe 149 to an inlet 127 to line 125 and pipe 150 is connected to an outlet 126 from line 123 and current directed to coil Y positions the valve to connect pipe 149 to an outlet 126 from line 123 and pipe 150 is connected to an inlet 127 to line 125.

With reference to FIG. 15 of the drawing electrical current is selectively directed to coils X and Y of the previously described valves through a circuit selector of a known type having rotary switches 152, 153, 154 and 155 each of which is provided with 12 contacts arranged in a circle and indicated by letters K, L, M, N, O, P, R, S, T, U, V, and W. Each of the switches is provided with a contact bar 156 having one end pivotally connected to the center of the switch and arranged to conduct current from the center of the switch to the contacts or from the contacts to the center of the switch in a manner and for a purpose to be explained. Bars 156 are mechanically connected together and connected to a rotary drive solenoid 157 as indicated at 158 so that the bars may be simultaneously moved to corresponding contacts on each of the switches. Rotary drive solenoid 157 is a known type such as is described in U.S. Patent Number 2,496,880 and is provided with a commutating switch 159, such as is described in U.S. Patent Number 2,501,950, so that when electrical current is directed to rotary drive solenoid 157 its movement is limited to the rotation required to move bars 156 from one contact to the next successive contact on each of the rotary switches. Electrical current is conducted to the machine from a power source 160 through lines 161 and 162. Line 162 is connected to coils X and Y of all of the fluid control valves and line 161 is connected to the centers of switches 152, 153 and 154 by leads 163. Current is directed to switch 155 from switch 152 in a manner to be explained and current from switch 155 passes through a line 164 extending from the center of switch 155 to a rectifier 165. A line 166 connected to line 162 is also connected to the rectifier to complete the circuit and permit current to flow from rectifier 165 through lines 167 and 168 to actuate rotary drive solenoid 157. The contacts on switches 153 and 154 are connected to coils X and Y of valves 130, 133, 136, 139, 142, 148 and 151 to selectively conduct current to each of the coils to complete the circuit to each coil as needed to actuate the valves. A welding transformer 169 having a secondary winding 170 connected to electrode pin supporting bars 40 and 63 and electrode wheel supporting block 100 and a primary winding 171 having a first lead 172 connected to line 162 and a second lead 173 connected to a line 174 having a contact switch 175 therein and which is connected to a line 176 extending from line 161, provides electrode pins 42 and 65 and electrode wheels 106 with a resistance welding current. A line 177 connected to line 176 and provided with a contact switch 178 extends to coil Y of valve 145 and a line 179 connected to line 176 and provided with a contact switch 180 extends to coil X of valve 145 to provide current for completing the circuit to these coils to actuate valve 145 as needed. Electrical current is conducted from rotary switch 152 to rotary switch 155 through lines extending between the corresponding contacts on each switch. Contacts K of switches 152 and 155 are connected by a line 181 which is provided with a normally open manually closed switch 182 and contact switches 183 and 184. Contacts L are connected by a line 185 provided with a contact switch 186 and contacts M are connected by a line 187 having a contact switch 188 therein. Contacts N are connected by a line 189 provided with a contact switch 190 and contacts O are connected by a line 191 provided with a switch 192. Contacts P are connected by a line 193 having a contact switch 194 therein and contacts R are connected by a line 195 having contact switches 196 and 197 and a switch 198 similar to switch 182 therein. Contacts S are connected through line 185 by lines 199 and 199' connected thereto and contacts T are connected by a line 200 provided with a contact switch 201. Contacts U are connected through line 189 and switch 190 by lines 202 and 202' connected thereto and contacts V are connected by a line 203 provided with a contact switch 204. Contacts W are connected by a line 205 having a contact switch 206 therein. Contact switches 175 and 178 are mechanically connected together as indicated at 207 and switches 180 and 190 are mechanically connected together as indicated at 208 so that these switches operate together in a manner and for a purpose to be explained. The contact switches included in the foregoing description are of a known type which are normally held open by a spring and closed by pressure exerted thereagainst either manually or by a moving part of the machine. The switches are arranged so that they are operated in proper sequence by the movements of the various parts of the machine in a manner to be described and each switch may also be manually operated as necessary to move various parts of the machine to a desired position.

Figure 8:
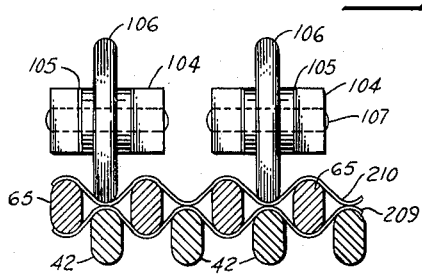
FIG. 8 illustrates the relative positions of the welding electrodes and the corrugated metal strips at the beginning of the machine's operation.
Figure 9:
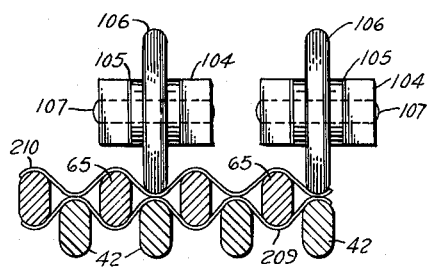
FIG. 9 illustrates a change in the position of one set of electrodes during the welding operation.
Figure 10:
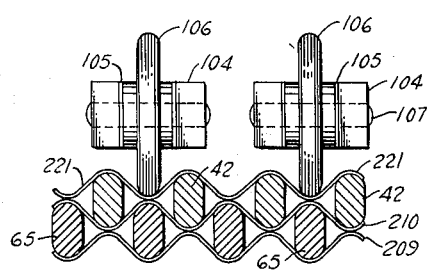
FIG. 10 illustrates a change in the position of the other set of electrodes and the corrugated metal strips during the cycle of operation.
Figure 11:
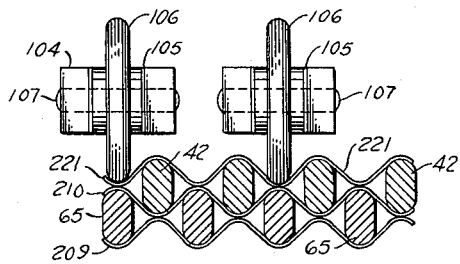
FIG. 11 illustrates still another change in the position of one set of electrodes during the welding operation.
Figure 12:
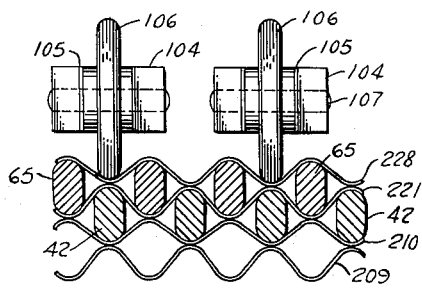
FIG. 12 shows the position of the electrodes and the corrugated metal strips at the end of a complete cycle of the machine's operation.

To prepare the machine for operation piston and piston rod 28 of cylinder and piston assembly 27 are poitioned toward the head end of the cylinder and piston and piston rod 38 of cylinder and piston assembly 37 are positioned toward the rod end of the cylinder. Piston and piston rod 52 of cylinder and piston assembly 51 are positioned toward the head end of the cylinder and piston and piston rod 61 of cylinder and piston assembly 60 are positioned toward the rod end of the cylinder. In this position plates 22, 33, 46 and 56 are positioned so that electrode pins 42 and 65 connected thereto are positioned as shown in FIGS. 8 and 9 with pins 42 disposed below and between pins 65. Contact switches 183, 192, 194, 197, 204 and 206 are all operated by movement of plates 22, 33, 46 and 56 and in the described positions of the plates switches 192, 194 and 204 are open and switches 183, 197, and 206 are held closed as shown in FIG. 14. Piston and piston rod 94 of cylinder and piston assembly 93 are positioned toward the rod end of the cylinder and piston and piston rod 97 of cylinder and piston assembly 96 are positioned toward the rod end of the cylinder to thereby position frame 80 so that electrode wheels 106 are in alignment with electrode pins 42. Contact switches 184, 188, 196 and 201 are operated by movement of frame 80 or cylinder and piston assemblies 93 and 96 and in the above described positions switches 188 and 196 are open and switches 184 and 201 are held closed. Piston and piston rod 112 of cylinder and piston assembly 111 are positioned toward the head end of the cylinder to thereby position plate 88 with block 114 and block 100 attached thereto, within frame 80 so that electrode wheels 106 are disposed above electrode pins 42 and 65 as shown in FIG. 3. Contact switches 175, 178, 180, 190 and 186 are operated by movements of plate 88 and the parts attached thereto and in the position described switches 175, 178 and 186 are open and switches 180 and 190 are held closed. A strip of corrugated metal 209 such as aluminum or stainless steel, having a thickness of from .002 to .010 inch, is placed over electrode pins 42 and under pins 65 as shown in FIG. 8 and a second strip 210 of similarly corrugated metal of the same type is placed over electrodes 65 with the strips in contact with each other over electrode pins 42. In the starting position contact bars 156 of rotary switches 152, 153, 154 and 155 are all on contact K as shown in FIG. 15 of the drawing. In this position current passes along lead 163 to the center of switch 152 and out along bar 156 through contact K and line 181 to open switch 182 and along lead 163 to the center of switch 153 and out along bar 156 through contact K and a line 211 to coil X of valve 139 to energize the coil. Valve 139 is thus positioned to direct fluid under pressure through pipe 138 to the head end of cylinder and piston assembly 60 which, since piston and piston rod 61 are already positioned toward the head end of the cylinder, does not cause any movement of rod 61. Current is also conducted from the center of switch 154 through bar 156 contact K and a line 212 to coil X of valve 148 energizing the coil and positioning valve 148 so that pressurized fluid passes through pipe 147 to the head end of cylinder and piston assembly 96. Since piston and piston rod 97 are already positioned at the rod end of the cylinder the pressurized fluid directed to cylinder and piston assembly 96 does not cause any movement of rod 97. To start the machine switch 182 is manually closed for a brief time to permit current to flow through line 181 and closed switches 183 and 184 to contact K of switch 155, along bar 156 to the center of switch 155 and along line 164 to rectifier 165 to complete the circuit to the rectifier and direct current through lines 167 and 168 thereby energizing rotary drive solenoid 157 causing it to rotate and move bars 156 to contacts L. With bars 156 in this position current passes from the center of switch 152 through bar 156, contact L and line 185 to open switch 186 and from the center of switch 153 through bar 156 and a line 213 connected to contact L to coil Y of valve 142. Coil Y being energized causes valve 142 to be positioned so that fluid under pressure passes through pipe 141 to the head end of cylinder and piston assembly 111 causing rod 112 to move outwardly therefrom and thereby move plate 88 and electrode wheels 106 connected thereto so that wheels 106 are moved along electrode pins 42. As plate 88 begins to move switches 190 and 180 are released and allowed to open and switches 175 and 178 are engaged by plate 88 and closed. Closing switch 175 permits current to flow through line 174 to welding transformer 169 completing the circuit thereto to provide electrode wheels 106 and pins 42 and 65 with welding current. Closing switch 178 permits current to flow through line 177 to coil Y of valve 145 to position the valve so that pressurized fluid is directed through pipe 144 to the head end of cylinder and piston assembly 108 to urge rod 109 outwardly against arms 103 so that electrode wheels 106 supported on arms 103 are pressed against metal strips 209, 210 and electrode pins 42 with a welding pressure. Electrode wheels 106 being spaced apart a distance equal to twice the distance between electrode pins 42, as previously described, pass across strips 209 and 210 over alternate electrode pins 42, as shown in FIG. 8, to weld the strips together at these points. When wheels 106 have been passed across the entire width of strips 209 and 210 switch 186 is contacted and closed. Current will then pass along line 185 through switch 186 to contact L of rotary switch 155 and along bar 156 and line 164 to rectifier 165 to complete the circuit thereto and direct current through lines 167 and 168 thereby energizing rotary solenoid drive 157 causing it to rotate and move bars 156 to contacts M. With bars 156 positioned on contacts M current passes from the center of switch 152 through bar 156 and contact M and through line 187 connected to contact M, to open switch 188. Current also passes from the center of switch 153 through bar 156 and contact M to a line 214 connected to contact M and coil Y of valve 151 to energize coil Y moving valve 151 to a position in which pressurized fluid is admitted to pipe 149 from line 123. Pipe 149 conveys pressurized fluid to the rod end of cylinder and piston assembly 93 causing rod 94 to be moved toward the head end of the cylinder thereby moving frame 80 sidewise to distance equal to the distance between the centers of electrode pins 42. The sidewise movement of frame 80 moves electrode wheels 106 into alignment with pins 42 adjacent those over which wheels 106 passed in the above described welding operation as shown in FIG. 9 of the drawing. Sidewise movement of frame 80 closes switch 188 permitting current to pass along line 187 to contact M of rotary switch 155 along bar 156 and line 164 to rectifier 164 to complete the circuit thereto and direct current along lines 167 and 168 thereby energizing rotary solenoid drive 157 causing it to rotate and thereby move all of bars 156 to contacts N. With bars 156 positioned on contacts N current passes from the center of switch 152 through bar 156, contact N, and line 189 to open switch 190. Current also passes from the center of switch 153 through bar 156 and contact N to a line 215 connected to contact N and to coil X of valve 142 to energize coil X moving valve 142 to a position connecting pipe 141 to inlets 127 of line 123 and connecting pipe 140 to an outlet 126 from line 123. Pressurized fluid is conducted to the rod end of cylinder and piston assembly 111 from line 123 through pipe 140 causing rod 112 to move toward the head end of the cylinder and thereby move plate 88 and electrode wheels 106 connected thereto, moving wheels 106 back across strips 209 and 210 to complete the welding operation whereby all of the contacting portions of strips 209 and 210 positioned on electrode pins 42 are welded together. When electrode wheels 106 have moved back across strips 209 and 210 the continued upward movement of plate 88 releases switches 175 and 178 permitting them to open thereby stopping the flow of current to transformer 169 and coil Y of valve 145 and switches 180 and 190 are contacted and closed. Closing switch 180 permits current to pass along line 179 to coil X of valve 145 energizing the coil and positioning the valve so that pipe 144 is connected to inlet 127 of line 125 and pipe 143 is connected to outlet 126 of line 123. Pressurized fluid is passed through line 143 to the rod end of cylinder and piston assembly 108 moving rod 109 back toward the head end of the cylinder to relieve arms 103 of the pressure applied thereto by rod 109. Closing switch 190 allows current to pass therethrough along line 189 to contact N of switch 155, along bar 156 and out through line 164 to rectifier 165 to complete the circuit thereto and direct current through lines 167 and 168 to energize rotary drive solenoid 157 causing it to rotate and move all of bars 156 to contacts O. With bars 156 positioned on contacts O current flows from the center of switch 152 through bar 156, contact O and line 191 to open switch 192. Current also flows from the center of switch 153 through bar 156, contact O and a line 216 connected to contact O and coil Y of valve 133 to energize the coil and position valve 133 so that pipe 131 is connected to an outlet 126 of line 123 and pipe 132 is connected to an inlet 127 to line 125. Pressurized fluid passes through pipe 131 to the rod end of cylinder and piston assembly 37 moving rod 38 toward the head end of the cylinder and moving plate 33 and electorde pins 42 connected thereto away from plate 56 and electrode pins 65 so that pins 42 are withdrawn from beneath metal strip 209. In this position metal strips 209 and 210 being welded together on each side of electrode pins 65 are entirely supported on pins 65. Movement of plate 33 away from plate 56 permits switch 197 to open and plate 33 contacts and closes switch 192 to allow current to flow through line 191 to contacts O of switch 155. Current flows from contact O to the center of switch 155 along bar 156 and out along line 164 to rectifier 165 to complete the circuit thereto and direct current through lines 167 and 168 to rotary solenoid 157 thereby causing drive 157 to rotate moving all of bars 156 to contacts P. With bars 156 positioned on contacts P current flows from the center of switch 152 through bar 156, contact P and line 193 to open switch 194. Current also passes from the center of switch 153 along bar 156 to contact P and through a line 217 connected to contact P and coil Y of valve 130 to energize the coil and position valve 130 so that pipe 129 is connected to an outlet 126 from line 123 and pipe 128 is connected to an inlet 127 to line 125. Current is also passed from the center of switch 154 through bar 156 to contact P and through a line 218 connected to contact P and coil Y of valve 136 to energize the coil and position valve 136 so that pipe 134 is connected to outlet 126 from line 123 and pipe 135 is connected to an inlet 127 to line 125. Since current flows simultaneously to coils Y of valves 130 and 136 the valves move to the described positions at the same time and fluid under pressure passes through pipe 129 to the head end of cylinder and piston assembly 27 and through pipe 134 to the rod end of cylinder and piston assembly 51 simultaneously. Pressurized fluid directed to the head end of cylinder and piston assembly 27 causes rod 28 to move outwardly away from the head end of the cylinder and move plates 22 and 33, to which electrode pins 42 are attached, outwardly. Pressurized fluid directed to the rod end of cylinder and piston assembly 51 causes piston rod 52 to move inwardly toward the head end of the cylinder to move plates 46 and 56 to which electrode pins 65 are attached, inwardly. Movement of plates 22 and 33 as above described permits switch 206 to open and movement of plates 46 and 56 as described causes switch 194 to be closed so that current flows therethrough along line 193 to contact P of switch 155 and along bar 156 to line 164 completing the circuit to rectifier 165 so that current flows along lines 167 and 168 to rotary drive solenoid 157 causing it to rotate and move all of bars 156 to contacts R. With contact bars 156 positioned on contacts R current flows from the center of switch 152 through bar 156 and line 195 to open switch 196 and from the center of switch 153 through bar 156 and contact R and through a line 219 connected to contact R and coil X of valve 133 to energize the coil and position valve 133 so that pipe 132 is connected to an outlet 126 of line 123 and pipe 131 is connected to an inlet 127 to line 125. Current also passes from the center of switch 154 through bar 156 and contact R and through a line 220 connected to contact R and coil Y of valve 148 to energize the coil and move the valve to a position in which pipe 146 is connected to an outlet from line 123 and pipe 147 is connected to an inlet 127 to line 125. Pressurized fluid passes through valve 133 and pipe 132 to the head end of cylinder and piston assembly 37 causing rod 38 to be moved outwardly away from the head end of the cylinder moving plate 33 and electrode pins 42 connected thereto toward plate 56 and electrode pins 65. The positions of pins 42 and 65 having been changed as previously described pins 42 pass over corrugated strip 210 and are positioned relative to pins 65 as shown in FIG. 10 as they are moved toward plate 56. Pressurized fluid passes through valve 148 and pipe 146 to the rod end of cylinder and piston assembly 96 causing piston rod 97 to move toward the head end of the cylinder and thereby moving cylinder and piston assembly 93 and frame 80 connected thereto and on which electrode wheels 106 are supported in the manner previously described, sidewise a distance equal to one-half of the distance between the centers of pins 42 to thereby align the wheels with electrode pins 65 as shown in FIG. 10. Electrical current being directed to coil X of valve 133 and coil Y of valve 148 simultaneously the valves are moved simultaneously to the described positions so that the above described movements of plate 33 and frame 80 occur at the same time. Movement of plate 33 as above described permits switch 192 to open and closes switch 197 and movement of piston and cylinder assembly 93 and frame 80 permits switch 184 to open and closes switch 196. With switches 196 and 197 closed current is permitted to pass therethrough along line 195 to open switch 198. Electrode wheels 106 and electrode pins 42 and 65 being positioned as described a third strip of corrugated metal 221 is placed over pins 42 and in contact with strip 210 directly over pins 65 as shown in FIG. 10. Switch 198 is then closed momentarily allowing current to pass therethrough and through line 195 to contact R of switch 155, through bar 156 and line 164 to rectifier 165 to complete the circuit thereto allowing current to pass through lines 167 and 168 from rectifier 165 to rotary solenoid drive 157 which then rotates moving all of bars 156 to contacts S. With bars 156 positoned on contacts S current passes from the center of switch 152 through bar 156, contact S, line 199 and line 185 connected thereto, to open switch 186. Current also passes from the center of switch 153 through bar 156 to contact S and through a line 222 connected to contact S of switch 153 and connected to line 213, to pass current through line 213 to coil Y of valve 142. Coil Y being energized causes valve 142 to be positioned so that pressurized fluid is directed to the head end of cylinder and piston assembly 111 as previously described, moving piston rod 112 outwardly to thereby move plate 88 and electrode wheels 106 connected thereto toward electrode pins 65. As plate 88 and wheels 106 are moved switches 190 and 180 are permitted to open and switches 175 and 178 are closed so that current flows to transformer 169 to provide electrode pins 42 and 65 and electrode wheels 106 with welding current and current also passes to coil Y of valve 145 as previously described. Energizing coil Y of valve 145 positions the valve to direct fluid under pressure to the head end of cylinder and piston assembly 108 to provide wheels 106 with a welding pressure as earlier described. When wheels 106 have moved across strip 221 thereby welding strip 221 to strip 210 at points above alternate electrode pins 65, switch 186 is contacted and closed thereby permitting current to pass therethrough along lines 185 and 199′ to contact S of switch 155. Current flows from contact S of switch 155 through bar 156 and line 164 to rectifier 165 completing the circuit thereto and current from rectifier 165 passes through lines 167 and 168 to rotary drive solenoid 157 causing it to rotate and move all of bars 156 to contacts T. With bars 156 positioned on contacts T current flows from the center of switch 152 through bar 156 and line 200 to open switch 201 and current also flows from the center of switch 153 through bar 156 to contact T and through a line 223 to coil X of valve 151. Energizing coil X of valve 151 positions the valve so that pipe 150 is connected to an outlet 126 of line 123 and line 149 is connected to an inlet 127 to line 125 so that pressurized fluid passes through pipe 150 to the head end of cylinder and piston assembly 93. Pressurized fluid directed to the head end of cylinder and piston 93 causes piston rod 94 to move outwardly away from the head end of the cylinder and thereby move frame 80 and electrode wheels 106 sidewise a distance equal to the distance between the centers of electrode pins 65 so that wheels 106 are aligned with pins 65 adjacent those over which wheels 106 passed as they moved across strip 221 as shown in FIG. 11. Sidewise movement of frame 80 permits switch 188 to open and switch 201 is contacted and closed to permit current to pass therethrough along line 200 to contact T of switch 155. Current flows from contact T of switch 155 through bar 156 and line 164 to complete the circuit to rectifier 165 so that current passes through lines 167 and 168 to rotary drive solenoid causing it to rotate and move all of bars 156 to contacts U. With contact arms positioned on contacts U current passes from the center of switch 152 through contact U and line 202 and 189 to open switch 190 and current also passes from the center of switch 153 through bar 156 to contact U and through line 224 connected to contact U and line 215 to coil X of valve 142. Energizing coil X of valve 142 positions the valve so that pressurized fluid is conducted to the rod end of cylinder and piston assembly 111 through pipe 170 in the manner previously described, causing rod 112 to move toward the head end of the cylinder and thereby move electrode wheels 106 back across strip 221 to complete the welding operation whereby strip 221 is welded to strip 210 at all contacting points. When electrode wheels 106 have been moved back across strip 221 the continued movement of plate 88 releases switches 175 and 178 to stop the flow of current to transformer 169 and coil Y of valve 145 and switches 180 and 190 are again contacted and closed. Closing switch 180 permits current to pass therethrough along line 176 to coil X of valve 145 to position the valve so that pressurized fluid is directed to the rod end of cylinder and piston assembly 108 in the manner previously described to move rod 109 away from arms 103. Closing switch 190 permits current to flow therethrough along lines 189 and 202′ to contact U of switch 155 and along bar 156 to line 164 to complete the circuit to rectifier 165 so that current passes through lines 167 and 168 to rotary drive solenoid 157 causing it to rotate and move all of contact bars 156 to contacts V. With contact bars 156 positioned on contacts V current passes from the center of switch 152 through bar 156 and line 203 to open switch 204 and from the center of switch 153 through bar 156 and a line 225 to coil Y of valve 139. Energizing coil Y of valve 139 positions the valve so that pipe 137 is connected to an outlet 126 from line 123 and pipe 138 is connected to an inlet 127 to line 125. Pressurized fluid passes through valve 139 and pipe 137 to the rod end of cylinder and piston assembly 60 causing piston rod 61 to move toward the head end of the cylinder thereby moving plate 56 and electrode pins 65 connected thereto away from plate 33 and electrode pins 42 and withdrawing pins 65 from between strips 209 and 210. Movement of plate 56 and pins 65 as above described permits switch 183 to open and closes switch 204 allowing current to flow therethrough along line 203 to contact V of switch 155. Current passes from contact V of switch 155 through bar 156 and along line 164 to complete the circuit to rectifier 165 so that current passes through lines 166 and 167 to rotary drive solenoid 157 causing it to rotate and move all of contact bars 156 to contacts W. With contact bars 156 positioned on contacts W current passes from the center of switch 152 through bar 156 and line 205 to open switch 206 and from the center of switch 153 through bar 156 and a line 226 to coil X of valve 130. Current also passes from the center of switch 154 through bar 156 and a line 227 connected to contact W and coil X of valve 136. Energizing coil X of valve 130 positions the valve so that pipe 128 is connected to an outlet 126 from line 123 and pipe 129 is connected to an inlet 127 to line 125 to thereby direct pressurized fluid to the rod end of the cylinder and piston assembly 27. Piston rod 28 is thus moved toward the head end of the cylinder thereby moving plates 22 and 33, to which electrode pins 42 are attached, inwardly. Energizing coil X of valve 136 positions the valve so that pipe 134 is connected to an inlet 127 to line 125 and pipe 135 is connected to an outlet 126 from line 123 to thereby direct pressurized fluid to the head end of cylinder and piston assembly 51. Piston rod 52 is thus moved away from the head end of the cylinder moving plates 46 and 56, to which electrode pins 65 are connected, outwardly. Movement of plates 22 and 33 and plates 46 and 56 as above described permits switch 194 to open and closes switch 206 so that current flows therethrough along line 205 to contact W of switch 155 and through bar 156 and line 164 to complete the circuit to rectifier 165 so that current passes through lines 166 and 167 to rotary drive solenoid 157 causing it to rotate and move all of bars 156 to contacts K. With contact bars positioned on contacts K current passes from the center of switch 152 through bar 156 and line 181 to open switch 182 and current passes from the center of switch 153 through bar 156 and line 211 of coil X of valve 139. Current also passes from the center of switch 154 through bar 156 and line 212 to coil X of valve 148. Energizing coil X of valve 139 positions the valve so that pipe 137 is connected to an inlet 127 to line 125 and pipe 138 is connected to an outlet 126 from line 123. Pressurized fluid is thus directed through valve 139 and pipe 138 to the head end of cylinder and piston assembly 60 moving piston rod 61 outwardly away from the head end of the cylinder and thereby moving plate 56 and electrode pins 65 toward plate 33 and electrode pins 42. The positions of pins 42 and 65 having been changed by the movement of plates 22 and 33 and plates 46 and 56 as before described, pins 65 pass along the upper surface of strip 221 as the pins move toward plate 33 to positions relative to pins 42 as shown in FIG. 12. Movement of plates 46 and 56 as above described permits switch 204 to open and switch 183 is contacted and closed. Energizing coil X of valve 148 positions the valve so that pipe 146 is connected to an inlet 127 to line 125 and pipe 147 is connected to an outlet 126 from line 123. Pressurized fluid passes through valve 148 and pipe 147 to the head end of cylinder and piston 96 to move piston rod 97 outwardly away from the head end of the cylinder thereby moving cylinder and piston assembly 93 and frame 80 sidewise a distance equal to one-half the distance between the centers of electrode pins 65 and thereby align electrode wheels 106 with electrode pins 42 as shown in FIG. 13. Movement of piston rod 97 and frame 80 as described permits switch 201 to open and switch 184 is contacted and closed. The machine has now completed one entire cycle of operation whereby strip 210 has been welded to strip 209 and strip 221 has been welded to strip 210 and all of the moving parts of the machine are back in their original starting positions. By placing another strip 228 of corrugated metal over pins 65 another operational cycle, as above described, may be begun and repeated as often as necessary to produce a honeycomb core of desired size. As additional strips of corrugated metal are welded to the structure the honeycomb core thus produced is moved rearwardly along a plate 23 secured to members 17 and 18 which supports the core as successive strips of metal are being welded thereto.

It is to be understood that the honeycomb core produced by the above described method and apparatus is not limited to honeycomb having cells shaped as shown in the drawing. Corrugated metal strips in which the corrugations are shaped to form a honeycomb cell of desired configuration may be similarly welded together and the shape of pins 42 and 65 may be varied to provide suitable supporting electrodes for these corrugated strips.

This invention may be embodied in other forms or carried out in other ways without departing from the spirit or essential characteristics thereof. The present embodiment of the invention is therefore to be considerd as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A resistance welding machine for welding strips of corrugated metal together at predetermined spaced apart points, comprising: a first set of evenly spaced apart parallel pins disposed in a common plane and arranged to support a first strip of corrugated metal; means for supporting said first set of pins, said supporting means being arranged and constructed to move said first set of pins axially and normal to the plane of the pins; a second set of evenly spaced apart parallel pins disposed in a common plane and extending between and parallel to said first set of pins, said second set of pins being arranged to support a second strip of corrugated metal disposed over said first strip and in contact with said first strip over each of the pins of said first set; means for supporting said second set of pins, said supporting means being arranged and constructed to move said second set of pins axially and normal to the plane of the pins; a plurality of wheels rotatably supported in alignment with selected pins of said first set; means for moving said wheels across said corrugated strips along said selected pins; and means for simultaneously passing a welding current through said corrugated strips between said pins and wheels.

2. A resistance welding machine for welding strips of corrugated metal together at predetermined spaced apart points, comprising: a first set of evenly spaced apart substantially parallel pins disposed in a common plane and arranged to support a first strip of corrugated metal; means operatively connected to said first set of pins for moving the same axially and normal to the plane of the pins; a second set of evenly spaced apart substantially parallel pins disposed in a common plane and extending between and parallel to said first set of pins, said second set of pins being arranged to support a second strip of corrugated metal over said first strip and in contact with said first strip over each pin of said first set; means operatively connected to said second set of pins for moving the same axially and normal to the plane of the pins; a plurality of spaced apart wheels in alignment with alternate pins of said first set; means rotatably supporting said wheels for movement thereof across said corrugated strips along said alternate pins, said wheel supporting means being connected to and supported by a movable support arranged and constructed for movement in a plane parallel to the axes of said pins in a direction coinciding with the axes of said pins and sidewise in a direction normal to the axes of said pins; means for moving said movable support in a direction coinciding with the axes of said pins to thereby move said wheels across said corrugated strips along said alternate pins; means for simultaneously passing an electrical welding current between said wheels and alternate pins; means for moving said movable support and wheel supporting means sidewise a distance sufficient to align said wheels with the pins of said first set which are disposed between said alternate pins; and means for moving said wheels back across said corrugated strips along the pins disposed between said alternate pins while simultaneously passing welding current from said wheels through said strips.

3. A resistance welding machine as claimed in claim 2; in which said means for moving said first set of pins axially and normal to the plane of the pins includes means for moving said first set of pins endwise to remove the pins of the first set from between the pins of said second set.

4. A resistance welding machine as claimed in claim 2; in which said means for moving said first set of pins axially and normal to the plane of the pins includes means for moving said first set of pins toward the plane passing through the pins of said second set.

5. A resistance welding machine as claimed in claim 2; in which said means for moving said second set of pins axially and normal to the plane of the pins includes means for moving said second set of pins endwise and away from the pins of said first set.

6. A resistance welding machine as claimed in claim 2; in which said means for moving said second set of pins axially and normal to the plane of the pins includes means for moving said second set of pins toward the plane passing through the pins of said first set.

7. A resistance welding machine as claimed in claim 2; in which means is provided for moving said movable support and said wheel supporting means sidewise a distance sufficient to align said wheels with alternate pins of said second set.

8. A resistance welding machine for welding successive strips of thin corrugated metal together at spaced apart points along the entire length thereof to form a metallic honeycomb structure, comprising: a first set of evenly spaced apart parallel pins disposed in a common plane, said pins being arranged to support a first strip of corrugated metal; a second set of evenly spaced apart parallel pins disposed in a common plane, said second set of pins being positioned to extend along the upper surface of said first strip of corrugated metal between and parallel to the pins of said first set and arranged to support a second strip of corrugated metal disposed over said first strip with portions of said first and second strips of metal in contact with each other over each of the pins of said first set; a plurality of wheels rotatably supported in alignment with alternate pins of said first set; means for moving said wheels across said corrugated metal strips along said alternate pins; means for simultaneously passing a welding current between said alternate pins and wheels; means for moving said wheels sidewise a distance equal to the distance between the pins of said first set; means for moving said wheels back across said strips of corrugated metal along the pins of said first set which are located between said alternate pins; means for simultaneously passing a welding current between said wheels and said pins of said first set; means operatively connected to said first set of pins for moving the same endwise in a direction away from the pins of said second set; means operatively connected to said first set of pins for moving the same in a direction toward the plane passing through the pins of said second set; means operatively connected to said second set of pins for moving the same in a direction coinciding with the axes of the pins; mean operatively connected to said second set of pins in for moving the same a direction normal to the axes of the pins; and means for moving said wheels sidewise into alignment with the pins of said second set.

9. A resistance welding machine for welding successive strips of corrugated metal together at predetermined spaced apart points, comprising: a first set of evenly spaced apart pins disposed in a common plane and arranged to support a first strip of corrugated metal; a movable support adapted to support said first set of pins in fixed positions relative to each other; means for moving said support to simultaneously move all of the pins of said first set of pins in a direction coinciding with the axes of said pins; means for moving said support to simultaneously move all of the pins of said first set of pins in a direction normal to the axes of said pins; a second set of evenly spaced apart pins disposed in a common plane and extending between and substantially parallel to the pins of said first set, said second set of pins being arranged to support a second strip of corrugated metal over said first set of pins; a second movable support adapted to support; means for moving said second set of pins in fixed positions relative to each other, said support to simultaneously move all of the pins of said second set of pins in a direction coinciding with the axes of said pins; means for moving said second support to simultaneously move all of the pins of said second set of pins in a direction normal to the axes of said pins; a plurality of wheels positioned in alignment with selected pins of said first set of pins; means rotatably supporting said wheels for movement thereof across said corrugated strips and along said selected pins comprising a movable supporting member arranged to rotatably support said wheels and movable only in a plane parallel to the axes of said pins; means for moving said supporting member toward said strips of corrugated metal thereby moving said wheels across said strips to compress said strips between said wheels and pins; and means for simultaneously passing a welding current through said strips between said wheels and pins.

10. The method of resistance welding successive strips of corrugated metal together at predetermined spaced apart points to form a metallic honeycomb structure which comprises the steps of placing a first strip of corrugated metal on a first set of evenly spaced apart parallel pins disposed in a common plane with the lower surfaces of the upwardly extending corrugations of said first strip in contact with the upper surfaces of said pins; placing a second set of evenly spaced apart parallel pins disposed in a common plane over said first strip of corrugated metal along the upper surface and between the upwardly extending corrugations thereof; placing a second strip of corrugated metal over the pins of said second set with the lower surfaces of the upwardly extending corrugations thereof disposed on the upper surfaces of the pins of said second set and the lower surfaces of the downwardly extending corrugations thereof disposed along the upper surfaces of the upwardly extending corrugations of said first strip; moving a plurality of evenly spaced apart wheels across said corrugated metal strips along alternate pins of said first set of pins to a position beyond the ends of said second set of pins while simultaneously passing a welding current through said corrugated strips between said wheels and pins; moving said wheels sidewise in a plane parallel to the axis of said pins into alignment with the pins of said first set disposed between said alternate pins; moving said wheels back across said corrugated strips along the pins of said first set disposed between said alternate pins while simultaneously passing a welding current through said metal strips between said pins and wheels; moving all of the pins of the first set of pins endwise simultaneously in a direction away from the pins of said second set and from beneath said strips of corrugated metal; moving all of the pins of said second set of pins sidewise simultaneously in a direction toward the plane passing through the pins of said first set; moving all of the pins of said first set sidewise simultaneously in a direction toward the plane passing through the pins of said second set; and moving all of the pins of said first set endwise simultaneously in a direction toward the pins of said second set to a position in which the pins of said first set are disposed along the upper surface of said second strip of corrugated metal and between the upwardly extending corrugations thereof.

11. The method claimed in claim 10 which includes the additional steps of placing a third strip of corrugated metal over said first set of pins with the lower surfaces of the upwardly extending corrugations thereof disposed on said first set of pins and the lower surfaces of the downwardly extending corrugations thereof disposed along the upper surfaces of the upwardly extending corrugations of said second corrugated strip; moving said wheels sidewise into alignment with alternate pins of said second set of pins; moving said wheels across said third strip of corrugated metal along said alternate pins of said second set to a position beyond the ends of said first set of pins while simultaneously passing an electric welding current through said second and third strips between said pins and wheels; moving said wheels sidewise in a plane parallel to the axis of said pins and into alignment with the pins of said second set which are disposed between said alternate pins; and moving said wheels back across said strips of metal along the pins of said second set disposed between said alternate pins while simultaneously passing a welding current through said strips between said pins and wheels.

12. A supporting assembly for supporting two superposed metal webs for welding within a work area comprising: two sets of parallel web supporting electrode fingers arranged with the fingers of each set staggered in parallel relation to the fingers of the other set in the work area and arranged so each set of fingers is positioned to support one of the two webs with one set occupying a lower position supporting one web and with the other set occupying an upper position supporting the other web; vertical finger moving means to sequentially alternately position said sets of fingers at said lower and upper position respectively; longitudinal finger moving means operable to individually reciprocally withdraw each set of fingers from web supporting engagement in the work area and to re-insert the withdrawn set of fingers back in said work area; said longitudinal finger moving means further operable to withdraw each set of fingers when in the lower position and to insert the withdrawn set back into the work area over the two superposed webs after the withdrawn set of fingers has been raised to the upper position and the other set of fingers has been lowered to the lower position by the said vertical finger moving and supporting means.

13. A supporting assembly for supporting two superposed metal webs for welding within a work area comprising: two sets of parallel fingers arranged with the fingers of each set staggered in parallel relation to the fingers of the other set; vertical finger moving means to sequentially reciprocate each set of fingers in opposite directions to alternatively position said sets of fingers at relatively lower and upper positions respectively at a spaced first predetermined distance apart, and also operable to cause relative movement between said sets of fingers further away from one another at a second predetermined distance apart; longitudinal finger moving means to individually withdraw each set of fingers from the work area and thence insert each set of fingers back in the work area; control means operable to cause said vertical finger moving means to position one set of fingers at the upper position in supporting alignment with a first web and the other set of fingers at the lower position to support a second web during a welding operation and after completion of the welds cause said vetrical finger moving means to move at least one set of fingers to position the two sets of fingers the second predetermined distance apart so the first and second welded together webs are supported solely by the upper set of fingers.

14. The combination of claim 13 and wherein said control means is also operable to cause said longitudinal finger moving means to withdraw the lower set of fingers from the work area and to cause the vertical finger moving means to reverse the respective positions of said fingers before said longitudinal finger moving means moves the withdrawn set of fingers back into the work area, whereby the withdrawn fingers are moved to the upper position and the other set of fingers to the lower position to allow return of said withdrawn set of fingers to the work area above the two webs.

15. Means for making a unitary resistance welded honeycomb structure from webs of metal each formed to provide a series of half-cells defining first and second oppositely facing welding nodes, and wherein said webs are superposed one to the other with the first nodes of the lower web resistance welded to the second nodes of the upper web comprising; first and second sets of parallel equidistantly spaced electrode fingers; the fingers of the first set disposed in staggered parallel relation to the fingers of the second set; the spacing between the center parts of the fingers of each set being equal to the spacing between the center points of adjacent first nodes of the webs; a work area in which the unwelded webs are superposed one to the other with the first nodes of the lower web in contact with the second nodes of the upper web; means to alternately position said sets of fingers in a first position in said work area whereat said first set of fingers is disposed to support the first nodes of the lower web and the second set of fingers is disposed to support the first nodes of the upper web, and to a second position in said work area whereat said second set of fingers is disposed to support the first nodes of the lower web and the first set of fingers is disposed to support the first nodes of the upper web; a plurality of electrode elements mounted over said set of fingers and spaced and aligned corresponding to the spacing and alignment (of certain ones) of the fingers of one set of electrode fingers; means to cause relative longitudinal movement of said element and fingers; means to cause relative transverse movement between said electrode elements and said sets of fingers to align said electrode elements in a first position to cause said elements to align with the first set of fingers when said sets of fingers are in their first position and to a second position to align with the second set of fingers when the sets of fingers are in their second position; said electrode elements arranged to engage the top of the second nodes of the upper web while said electrode elements and fingers are relatively longitudinally moved; and means for establishing a welding circuit between said electrode elements and the set of electrode fingers aligned therewith to cause resistance welding of said second nodes of said upper web with the first nodes of said lower web.

16. Means for making a unitary resistance welded honeycomb structure from at least two webs of metal each defining first and second oppositely facing welding nodes, and wherein said webs are superposed one to the other with the first nodes of the first web resistance welded to the second nodes of the second web comprising; first and second sets of parallel equidistantly spaced electrode fingers, the fingers of the first set disposed in staggered parallel relation to the fingers of the second set; the spacing between center points of the fingers of each set being equal to the spacing between the center points of adjacent first nodes of the web; a work area in which the webs are superposed one to the other with the first nodes of the first web in contact with the second nodes of the second web; said sets of fingers independently positionable in said work area with said first set of fingers disposed to support the first nodes of the first web and with the second set of fingers disposed to support the first nodes of the second web; and a set of electrode elements spaced and aligned correspondingly to the spacing and alignment (of certain ones) of said first set of electrode fingers; said set of electrode elements positionable in said work area in electrical contact with the second nodes of said second web; means for establishing a welding circuit between said set of electrode elements and said first set of electrode fingers to cause resistance welding of said second nodes of said second web with the first nodes of said first web; and means for withdrawing said first set of fingers from said work area and from supporting engagement with said first web while maintaining said first and second welded webs supported by said second sets of fingers in contact with the first nodes of said second web after said first and second webs have been welded together.

17. Means for making a unitary resistance welded honeycomb structure from at least two webs of metal each defining first and second oppositely facing welding nodes, and wherein said webs are superposed one to the other with the first nodes of the first web resistance welded to the second nodes of the second web comprising: first and second sets of parallel equidistantly spaced electrode fingers, the fingers of the first set disposed in staggered parallel relation to the fingers of the second set; the spacing between center points of the fingers of each set being equal to the spacing between the center points of adjacent first nodes of the web; a work area in which the webs are superposed one to the other with the first nodes of the first web in contact with the second nodes of the second web; said sets of fingers independently positionable in said work area with said first set of fingers disposed to support the first nodes of the first web and with the second set of fingers disposed to support the first nodes of the second web; a set of electrode elements spaced and aligned correspondingly to the spacing and alignment (of certain ones) of said first set of electrode fingers; said set of electrode elements positionable in said work area in electrical contact with the second nodes of said second web; means for establishing a welding circuit between said set of electrode elements and said first set of electrode fingers to cause resistance welding of said second nodes of said second web with the first nodes of said first web; means for withdrawing said electrode elements from said work area after said first and second webs have been welded together, whereby a third web may be superposed to said second web with the first nodes of said second web in contact with the second nodes of said third web; and means for withdrawing said first set of fingers from supporting engagement with the first nodes of said first web while said first and second welded webs are continually supported by said second set of fingers; said last mentioned means including means for depositing said first set of fingers in said work area in a position to support the first nodes of said third web.

18. Means for making a unitary resistance welded honeycomb structure from at least two webs of metal each defining first and second oppositely facing welding nodes, and wherein said webs are superposed one to the other with the first nodes of the first web resistance welded to the second nodes of the second web disposed above the first web comprising: first and second sets of parallel equidistantly spaced electrode fingers; the fingers of the first set disposed in staggered parallel relation to the fingers of the second set; the spacing between the center points of the fingers of each set being equal to the spacing between the center points of adjacent first nodes of the web; a work area in which the unwelded webs are superposed one to the other with the first nodes of the first web in contact with the second nodes of the second web; said sets of fingers independently positionable in said work area with each set of fingers disposed to alternately support the first nodes of the first web and the first nodes of the second web; a third set of electrodes comprising a plurality of aligned electrode wheels spaced in alignment with the fingers of the set of electrode fingers supporting the first nodes of the first web, and longitudinal wheel moving means to move said wheels longitudinally of said finger electrodes with each wheel traversing along a respectively associated second welding node of the second web; means to traversely move said welding wheels to a first position in alignment with the first set of fingers and to a second position in alignment with the second set of fingers; control means to cause said wheel moving means to move said wheels to the first position while said first set of fingers is in supporting position with the first nodes of the first web and to the second position while said second set of fingers is in supporting position with the first nodes of the first web, whereby said wheels are always disposed in alignment with the set of electrode fingers supporting the first node of the first web; said longitudinal wheel moving means operable to move said wheels in and out of the vertical plane of said work area; vertical wheel moving means to raise said welding wheels to an upper position above said webs and to a lower position with the wheels arranged with the rim of each wheel biased against a second node of the second web; said last named wheel raising means operable to maintain the wheels in lower position while the wheels are within the vertical plane of the work area and to raise the wheels while the wheels are out of the vertical plane of the work area; and means for establishing a welding circuit through said first and second webs between said third electrode and said set of electrode fingers supporting the first nodes of the first web to cause resistance welding of said second nodes of said second web with the first nodes of said first web.

19. Means for making a unitary resistance welded honeycomb structure from webs of metal each formed to provide a series of half-cells defining first and second oppositely facing welding nodes, and wherein said webs are superposed one to the other with first nodes of the lower web resistance welded to the second nodes of the upper web comprising: first and second sets of parallel equidistantly spaced electrode fingers; the fingers of the first set disposed in staggered parallel relation to the fingers of the second set; the spacing between the center points of the fingers of each set being equal to the spacing between the center points of adjacent first nodes of the webs; a work area in which the unwelded webs are superposed one to the other with the first nodes of the lower web in contact with the second nodes of the upper web; means to alternately position said sets of fingers in a first position in said work area whereat said first set of fingers is disposed to support the first nodes of the lower web and the second set of fingers is disposed to support the first nodes of the upper web, and to a second position in said work area whereat said second set of fingers is disposed to support the first nodes of the lower web and the first set of fingers is disposed to support the first nodes of the upper web; a carriage; means for moving said carriage through said work area above and parallel with the longitudinal axes of said first and second sets of electrode fingers; a plurality of electrode elements mounted on said carriage each spaced and aligned corresponding to the spacing and alignment (of certain) of the fingers of one set of electrode fingers; means to move transversely said electrode elements to a first position to cause said elements to align with the first set of fingers when said sets of fingers are in their first position, and to a second position to align with the second set of fingers when the said sets of fingers are in their second position; said electrode elements arranged to engage the top of the first nodes of the upper web while said carriage is longitudinally moved through said work area; and means for establishing a welding circuit between said electrode elements and the set of electrode fingers aligned therewith to cause resistance welding of said second nodes of said upper web with the first nodes of said lower web.

20. Means for making a unitary resistance welded honeycomb structure according to claim 19 and wherein said means for establishing a welding circuit comprises: means for energizing pairs of said electrode elements with electrical energy of opposite polarity; corresponding pairs of aligned electrode fingers electrically connected together whereby upon said energization of said electrode elements while in contact with nodes of the upper web there is established an electrical circuit between the elements of each energized pair of elements through the electrode fingers aligned therewith and through the upper and lower web nodes to cause resistance welding.

21. Means for making a unitary resistance welded honeycomb structure from webs of metal each formed to provide a series of half-cells defining first and second oppositely facing welding nodes, and wherein said webs are superposed one to the other with the first nodes of the first web resistance welded to the second nodes of a second web, comprising: two sets of parallel, equidistantly spaced electrode fingers; the fingers of each set disposed in staggered parallel relation to the fingers of the other set; the spacing between the center points of the fingers of each set being equal to the spacing between the center points of adjacent first nodes of the webs; a work area in which the unwelded webs are superposed one to the other with the first nodes of the first web in contact with the second nodes of the second web; each said set of fingers alternately positionable in said work area to support the first nodes of the first web and the first nodes of the second web; a carriage; means for moving said carriage relatively above and parallel to the longitudinal axis of said electrode fingers; a set of equidistantly spaced electrode elements mounted on said carriage; the spacing between adjacent elements being at least twice that of, and an integral multiple of, the spacing between adjacent fingers of each set; first electrode element shifting means to shift said elements in a transverse direction relative to said fingers and webs supported thereby to a plurality of positions whereat said elements are alinged with the fingers of the set of fingers supporting the first node of the first web and second welding element shifting means to shift said elements in a transverse direction relative to said fingers and webs supported thereby to a plurality of positions whereat each position said elements are arranged with a correspondingly spaced group of web nodes and fingers within the set supporting the first node of the first web and with said elements in electrical contact with the aligned group of second nodes of the second web during longitudinal movement of the carriage; and means to establish welding current from the elements through the contacted webs to their supporting fingers.

22. Means for making a unitary resistance welded honeycomb structure from webs of metal each formed to provide a series of half-cells defining first and second oppositely facing welding nodes, and wherein said webs are superposed one to the other with the first nodes of a first web resistance welded to the second nodes of a second web, comprising: two sets of parallel, equidistantly spaced electrode fingers; the fingers of each set disposed in staggered parallel relation to the fingers of each set being equal to the spacing between the center points of adjacent first nodes of the webs; a work area in which the unwelded webs are superposed one to the other with the first nodes of the first web in contact with the second nodes of the second web; each said set of fingers alternately positionable in said work area to support the first nodes of the first web and the first nodes of the second web; a carriage; means for moving said carriage relatively above and parallel to the longitudinal axis of said electrode fingers; a set of equidistantly spaced electrode elements spaced an integral multiple of the spacing between adjacent fingers of each set; first means to transversely move said electrode elements to a first position whereat the elements are in alignment with the fingers of one set of electrode fingers and to a second position whereat the electrode elements are in alignment with fingers of the other set of fingers; second means mounted on said first means for transversely moving said electrodes to a first position in alignment with selected fingers of the group of fingers with which the electrodes are aligned and to a second position to align the electrodes with another group of fingers of the set of fingers with which the electrodes are aligned; and means for estabilshing welding current from the electrode elements through the webs to the fingers aligned therewith.

References Cited by the Examiner

UNITED STATES PATENTS

| 2,747,064 | 5/1956 | Van Pappelendam | 219—78 |
| 2,780,716 | 2/1957 | Wasilisin | 219—82 X |
| 2,789,203 | 4/1957 | Pigo et al. | 219—78 |
| 2,821,616 | 1/1958 | Spott | 219—78 |
| 2,843,722 | 7/1958 | Wegeforth | 219—80 |
| 2,927,991 | 3/1960 | Shoelz | 219—87 |
| 2,975,263 | 3/1961 | Green et al. | 219—83 |

RICHARD M. WOOD, *Primary Examiner.*

MAX L. LEVY, *Examiner.*

JOSEPH V. TRUHE, *Assistant Examiner.*